United States Patent
Li

(10) Patent No.: US 9,577,732 B2
(45) Date of Patent: Feb. 21, 2017

(54) INFORMATION PROCESSING METHOD AND ELECTRONIC DEVICE WHICH SELECTIVELY OPERATES A TARGET ANTENNA

(71) Applicant: Lenovo (Beijing) Limited, Beijing (CN)

(72) Inventor: Xue Xia Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/812,016

(22) Filed: Jul. 29, 2015

(65) Prior Publication Data
US 2016/0285531 A1 Sep. 29, 2016

(30) Foreign Application Priority Data
Mar. 24, 2015 (CN) .......................... 2015 1 0129360

(51) Int. Cl.
| | | |
|---|---|---|
| *H04B 7/02* | (2006.01) | |
| *H04B 7/06* | (2006.01) | |
| *G06F 3/0481* | (2013.01) | |
| *H04W 4/00* | (2009.01) | |

(52) U.S. Cl.
CPC ............. *H04B 7/061* (2013.01); *G06F 3/0481* (2013.01); *H04W 4/008* (2013.01)

(58) Field of Classification Search
CPC ....... G06F 3/0481; H04B 7/061; H04W 4/008
See application file for complete search history.

(56) References Cited

U.S. PATENT DOCUMENTS

| | | | | |
|---|---|---|---|---|
| 8,965,785 B2 * | 2/2015 | Lee | ................... | G06Q 30/0241 705/14.4 |
| 2011/0060652 A1 * | 3/2011 | Morton | ................. | H04W 4/043 705/14.58 |
| 2012/0290396 A1 * | 11/2012 | Petrov | ................. | G06Q 10/087 705/14.64 |

* cited by examiner

*Primary Examiner* — David B. Lugo
(74) *Attorney, Agent, or Firm* — Ference & Associates LLC

(57) ABSTRACT

One embodiment provides a method, including: displaying a plurality of contents via a display screen of a first electronic device; determining a subset of a plurality of antennas of the first electronic device based on positions of the antennas relative to the display screen, wherein said subset of antennas corresponds with respective contents as displayed via the display screen of the first electronic device; activating the subset of the antennas of the first electronic device to determine a target antenna from said subset of the antennas that is closest to a second electronic device arranged with respect to the display screen of the first electronic device; and transmitting a target content from said contents as displayed from the first electronic device to the second electronic device, wherein the target content corresponds with the target antenna. Other aspects are described and claimed.

16 Claims, 6 Drawing Sheets

INFORMATION PROCESSING METHOD AND ELECTRONIC DEVICE WHICH SELECTIVELY OPERATES A TARGET ANTENNA

CLAIM FOR PRIORITY

This application claims priority to Chinese Application No. 201510129360.6, filed on Mar. 24, 2015, which is fully incorporated by reference herein.

FIELD

The subject matter described herein relates to an information processing technology, in particular, to an information processing method and an electronic device.

BACKGROUND

With the advent of short-distance wireless communication technologies, more and more terminal devices have short-distance wireless communication functions, and users also expect to use the short-distance wireless communication functions of smartphones to interact with other terminals. For example, in a mall, a display screen having a touch display function is often provided, such that a user may obtain information about commercial tenants in this mall, information about discount coupons issued by the commercial tenants, etc., through touch operations. In this scenario, a user expects, especially, to use the short-distance wireless communication function to download discount coupons of a certain commercial tenant to a smartphone. In the case of a display screen being large and displaying much content (for example, displaying a plurality of discount coupons), by locating the smartphone with respect to the displayed contents, the display content (for example, a certain discount coupon) closest to the smartphone is treated as content to be downloaded by the user. In the prior art, an antenna array is provided below the display screen. When a short-distance wireless communication function is activated, the antennas in the antenna array are scanned one by one to determine the location of the smartphone. When there are many antennas, it would take a large amount of time to locate the antenna closest to the smartphone, which is disadvantageous for user experience.

BRIEF SUMMARY

In summary, one aspect provides a method, comprising: displaying a plurality of contents via a display screen of a first electronic device; determining a subset of a plurality of antennas of the first electronic device based on positions of the antennas relative to the display screen, wherein said subset of antennas corresponds with respective contents as displayed via the display screen of the first electronic device; activating the subset of the antennas of the first electronic device to determine a target antenna from said subset of the antennas that is closest to a second electronic device arranged with respect to the display screen of the first electronic device; and transmitting a target content from said contents as displayed from the first electronic device to the second electronic device, wherein the target content corresponds with the target antenna.

Another aspect provides an electronic device, comprising: a display screen for displaying a plurality of contents; a plurality of antennas arranged relative to the display screen; a processor; and a storage media that stores instructions executable by the processor to: determine a subset of the plurality of antennas based on positions of the antennas relative to the display screen, said subset of antennas corresponding with respective contents as displayed via the display screen; activate the subset of antennas to determine a target antenna from said subset of antennas that is closest to another electronic device arranged with respect to the display screen; and transmit a target content from said contents as displayed to the other electronic device, the target content corresponding with the target antenna.

A further aspect provides a product, comprising: a storage device having code stored therewith, the code being executable by a processor and comprising: code that displays a plurality of contents via a display screen of a first electronic device; code that determines a subset of a plurality of antennas of the first electronic device based on positions of the antennas relative to the display screen, wherein said subset of antennas corresponds with respective contents as displayed via the display screen of the first electronic device; code that activates the subset of the antennas of the first electronic device to determine a target antenna from said subset of the antennas that is closest to a second electronic device arranged with respect to the display screen of the first electronic device; and code that transmits a target content from said contents as displayed from the first electronic device to the second electronic device, wherein the target content corresponds with the target antenna.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In the information processing method and electronic device provided by embodiments, a first antenna subset in an antenna set is determined according to a first strategy, wherein the antenna set is disposed at one side of a display screen of the electronic device; the antenna set has no influence on the sensing display content of the display screen, and a region where the antenna set is located corresponds to at least part of a display region of the display screen; antennas in the first antenna subset are successively allowed to be in an operating state so as to obtain feedback information of communication with a second electronic device; and, based on the feedback information of at least part of antennas in the first antenna subset, a target antenna communicating with the second electronic device is determined. Thus, by adopting the technical solutions provided by embodiments, on one hand, the number of enabled antennas is reduced through the first strategy, and the polling time of antennas is thus reduced; on the other hand, the time required for determining the target antenna is reduced, the locating speed of the second electronic device (e.g., a smartphone) is increased, and the user experience is improved.

Embodiment 1

Figure 1:
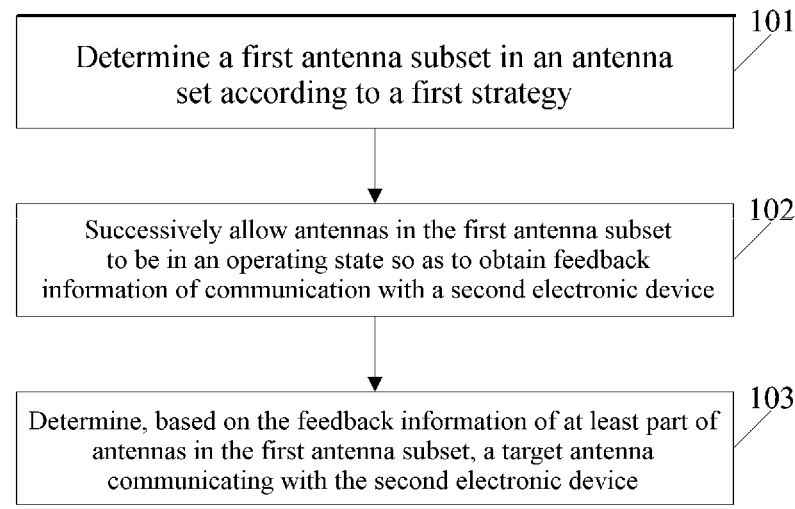
FIG. 1 is a flowchart of an information processing method according to embodiment 1.

An embodiment provides an information processing method. The information processing method is applied in an electronic device. FIG. 1 is a flowchart of the information processing method according to a first embodiment. As shown in FIG. 1, the information processing method comprises:

Step 101: A first antenna subset is determined in an antenna set according to a first strategy, wherein the antenna set is disposed at one side of a display screen of an electronic device; and, the antenna set has no influence on sensing display content on the display screen, and the region where the antenna set is located corresponds to at least part of the display region of the display screen.

The information processing method provided by an embodiment is applied in an electronic device comprising a display screen and an antenna set, wherein the antenna set is disposed at one side of the display screen, and the antenna set has no influence on sensing the display content on the display screen. It may also be understood as: if a first side of the display screen is the side capable of sensing display content, then the antenna set is disposed on a second side of the display screen. It may also be understood as: the antenna set is disposed inside the electronic device and close to the inner side of the display screen, such that a user is unable to see the antenna set, and the display screen has no influence on the communication of antennas in the antenna set. Of course, the antenna set may also be disposed on the second side of the display screen, that is, when a user watches display content on the display screen, the antenna set is closer to the user than the display screen. In an embodiment, the display screen is a display module for displaying content, and the electronic device further comprises a touch module which typically covers the display module for touch operations by a user. Then in an embodiment, the antenna set covers the display module. However, the arrangement of the antenna set has no influence on the display of the display module.

In an embodiment, the region where the antenna set is located may correspond to the display region of the display screen, that is, the region where the antenna set is located corresponds to the whole display region of the display screen. In another implementation, the region where the antenna set is located corresponds to part of the display region of the display screen.

As the execution body of the information processing method provided by an embodiment is the electronic device, in this step, the determining a first antenna subset from an antenna set according to a first strategy is: determining, by the electronic device, the first antenna subset from the antenna set according to the first strategy.

As an implementation, the determining a first antenna subset in an antenna set according to a first strategy includes: determining the first strategy according to display content of the electronic device, and determining the first antenna subset in the antenna set according to the first strategy.

Here, the first strategy is: an antenna set within a first sub-region in the region where the antenna set is located is used as the first antenna subset, wherein the first sub-region is smaller than the region where the antenna set is located; or, an antenna subset with a first density in the antenna set is used as the first antenna subset, wherein the first density is smaller than the density of the antenna set.

Figure 2A:
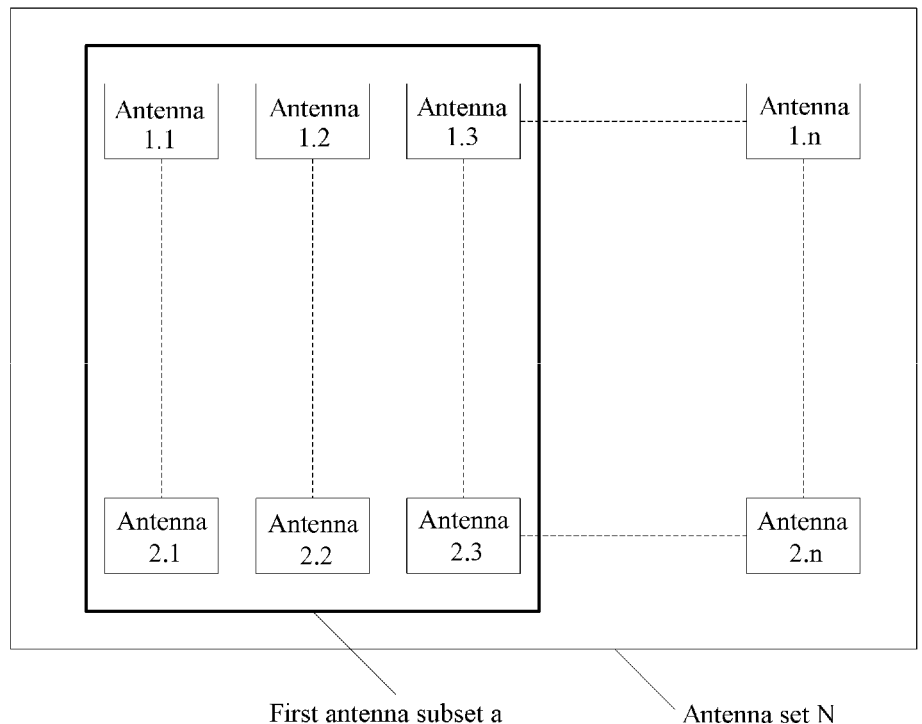
FIG. 2a and FIG. 2b are schematic diagrams of scenarios of determining a first antenna subset in an antenna set according to a first strategy according to an embodiment.
Figure 2B:
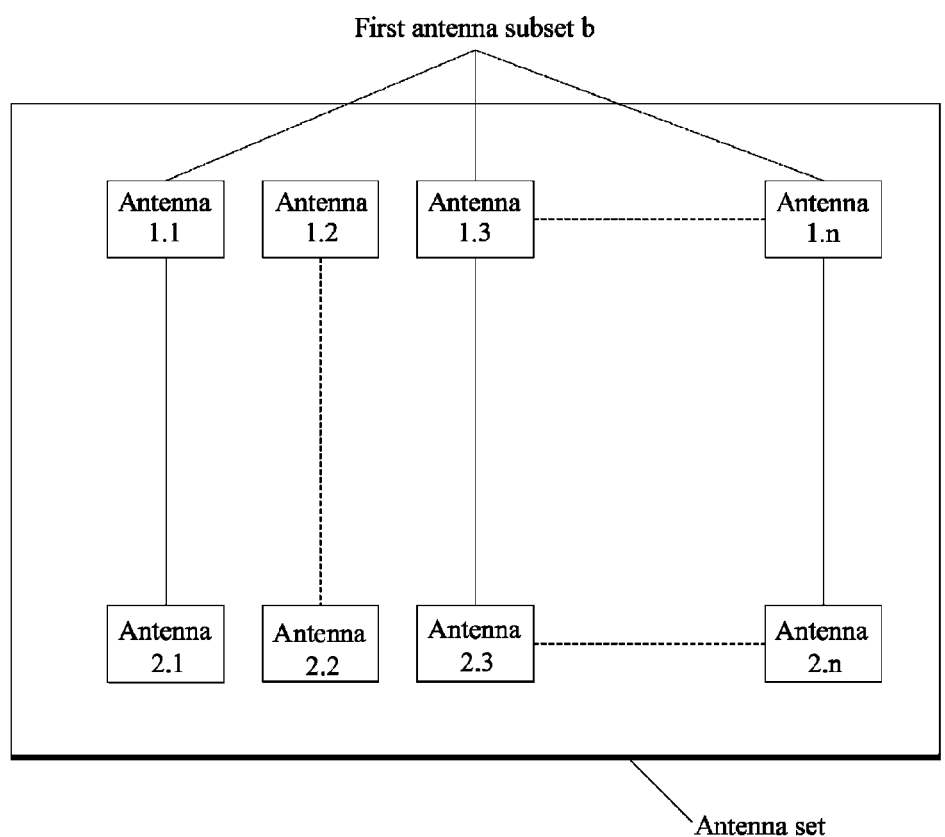

FIG. 2a and FIG. 2b are schematic diagrams of a scenario of determining a first antenna subset from an antenna set according to the first strategy in an embodiment. In FIG. 2a and FIG. 2b, antenna 1.1 to antenna 1.n and antenna 2.1 to antenna 2.n form an antenna set N. In this illustration, the antenna set N is an antenna array of 2*n (where n is a positive integer), meaning the antenna array comprises two rows and n columns of antennas. However, it should be appreciated that the antenna set N may comprise any number of rows of antennas, depending on the applications. As shown in FIG. 2a, the first strategy is that, in the region where the antenna set N is located, an antenna set within a region where antenna 1.1 to antenna 1.3 and antenna 2.1 to antenna 2.3 are located is selected as a first antenna subset a, and the first antenna subset a is an antenna array of 2*3. It can be understood that, under the first strategy, an antenna set corresponding to a sub-region within the region where the antenna set is located is selected as the first antenna subset. This illustration may be applied in the following scenario.

Many kinds of content such as discount coupons, text information and the like will be displayed on the display screen of the electronic device, and the discount coupons and text information are displayed in different regions of the display screen; equivalently, the electronic device has at least one functional region in which display content required by a user is displayed. Taking the number of the functional region being 1 in this illustration, as shown in FIG. 2a, the display region corresponding to the region where antenna 1.1 to antenna 1.3 and antenna 2.1 to antenna 2.3 are located is used as a functional region. This functional region displays discount coupons, while other display regions display text information. It can be understood that, the antennas corresponding to the functional region (e.g., the display region for discount coupons) are required to be in an operating state for locating, while the antennas corresponding to a non-functional region (e.g., a display region for text information) are not required to be in an operating state and thus not required for locating.

In another scenario, as shown in FIG. 2b, the first strategy is that 2*N/2 antennas are selected from the antenna set N of 2*n antennas to form a first antenna subset b, and the region where the first antenna subset b is located is the same as the region where the antenna set N is located. It can be understood that, under the second strategy, the range of coverage area of the first antenna subset is the same as that of the antenna set, only the density of the antenna array in the first antenna subset is different from that of the antenna array in the antenna set. For example, in FIG. 2b, the antenna set in the first antenna subset b includes antenna 1.1, antenna 1.3 . . . antenna 1.n, and antenna 2.1, antenna 2.3 . . . antenna 2.n. That is, in this illustration, antennas at odd positions are used as the first antenna subset b. This illustration may be applied in the following scenario.

The display screen of the electronic device will display a plurality of discount coupons, and the display region occupied by each discount coupon is relatively large or the spacing there between is relatively large; that is, the electronic device has a plurality of functional regions, and each functional region has a relatively large area or a relatively large spacing. Display content required by a user is displayed in each functional region. Since each functional region has a relatively large area or a relatively large spacing, the precision requirement of the first antenna subset in operating is not high. As shown in FIG. 2b, taking the antenna set in the antenna subset b including antenna 1.1, antenna 1.3 . . . antenna 1.n, and antenna 2.1, antenna 2.3 . . . antenna 2.n as an example, the display region corresponding to each antenna within the first antenna subset b is a functional region. Again, it should be appreciated that the antenna set may include any number of rows and columns of antennas, depending on the applications.

In an embodiment, the first strategy may be preset in the electronic device, and then the first antenna subset is determined in the antenna set according to the preset first strategy. The first strategy may also be generated according to content to be displayed on the display screen of the electronic device and based on attribute parameters of the content to be displayed, wherein the attribute parameters may be template parameters, and the template parameters include display sub-regions and the format of content to be displayed in each display sub-region. The electronic device may generate a first strategy according to the template parameters. In another implementation, a plurality of first strategies may be preset in the electronic device. For example, first strategy 1 is the strategy shown in FIG. 2a, while first strategy 2 is the strategy shown in FIG. 2b. The electronic device will, according to the content to be displayed on the display screen of the electronic device, choose a first strategy which matches the attribute parameters of the content to be displayed, and then determine the first antenna subset from the antenna set according to the selected first strategy.

In various embodiments, the antennas in the antenna set are used for near-field wireless communication. The near-field wireless communication is wireless communication having a communication distance less than a preset threshold, wherein the preset threshold may be set as 20 cm, and the distance between two adjacent antennas in the antenna set may be set as 10 cm. In this scenario, the electronic device may use an antenna subset with a first density of the antenna set as a first antenna subset, so as to facilitate a subsequent determination of the target antenna through feedback information received by a certain antenna. In another implementation, the preset threshold may also be set much lower, that is, a plurality of antennas may be disposed in the functional region of the electronic device, so as to facilitate subsequent determination of the target antenna, i.e., the antenna corresponding to the maximum communication parameter, or the antenna corresponding to the communication parameter exceeding a preset threshold in the feedback information received by the plurality of antennas. In these implementations, the antennas in the antenna array may be preferably Near Field Communication (NFC) antennas.

Step 102: Antennas in the first antenna subset are successively allowed to be in an operating state to obtain feedback information of communication with a second electronic device.

Here, the electronic device successively allows antennas to be in an operating state from the first antenna. As an implementation, the successively allowing antennas to be in an operating state from the first antenna may be as shown in FIG. 2a. The electronic device allows antenna 1.1 to be in an operating state, and then allows antenna 1.2 to be in an operating state after receiving feedback information from antenna 1.1, and so on, until each antenna in the first antenna subset a is successively allowed to be in an operating state, and feedback information from each antenna is received. As another implementation, as shown in FIG. 2b, the electronic device successively allows antennas to be in an operating state from antenna 1.1 and antenna 2.1, i.e., simultaneously allows antenna 1.1 and antenna 2.1 to be in an operating state, and then allows antenna 1.2 and antenna 2.2 to be in an operating state after receiving feedback information from antenna 1.1 and antenna 2.1, and so on, until each antenna in the first antenna subset b is successively allowed to be in an operating state, and feedback information from each antenna is received. In other words, in this implementation, in the first antenna subset, antennas are successively allowed to be in an operating state from the antenna in the first row or the first column.

In these implementations, the feedback information of the second electronic device includes communication parameters, and the communication parameters characterize the strength of wireless communication.

Step 103: A target antenna communicating with the second electronic device is determined based on the feedback information of at least part of antennas in the first antenna subset.

Here, the feedback information of the second electronic device includes communication parameters, and the communication parameters characterize the strength of wireless communication. It can be understood as: as an antenna is closer to the second electronic device, the strength of wireless communication characterized by the communication parameter received by the antenna becomes stronger; correspondingly, as an antenna is farther away from the second electronic device, the strength of wireless communication characterized by the communication parameter received by the antenna becomes weaker. Based on this, as a first implementation, an antenna having the maximum communication parameter, i.e., the antenna closest to the second electronic device, will be determined from the feedback information received by the first antenna subset, and the antenna is the target antenna. As a second implementation, at least one antenna having a communication parameter exceeding a first preset threshold will be determined from the feedback information received by the first antenna subset, and the at least one antenna is the target antenna. As a third implementation, feedback information of antennas is successively received in the process of successively allowing the antennas to be in an operating state; when it is determined that the communication parameter in the feedback information of an antenna reaches a second preset threshold, the antenna will be determined as the target antenna. This implementation is suitable for the case where there is one second electronic device, i.e., the scenario where only one second electronic device communicates with the electronic device.

By adopting the technical solutions provided by this embodiment, on one hand, the number of enabled antennas is reduced through the first strategy, and the polling time of antennas is thus reduced; on the other hand, the time required for determining a target antenna is reduced, the locating speed of a second electronic device (e.g., a smartphone) is thus increased, and the user experience is improved.

Embodiment 2

Figure 3:
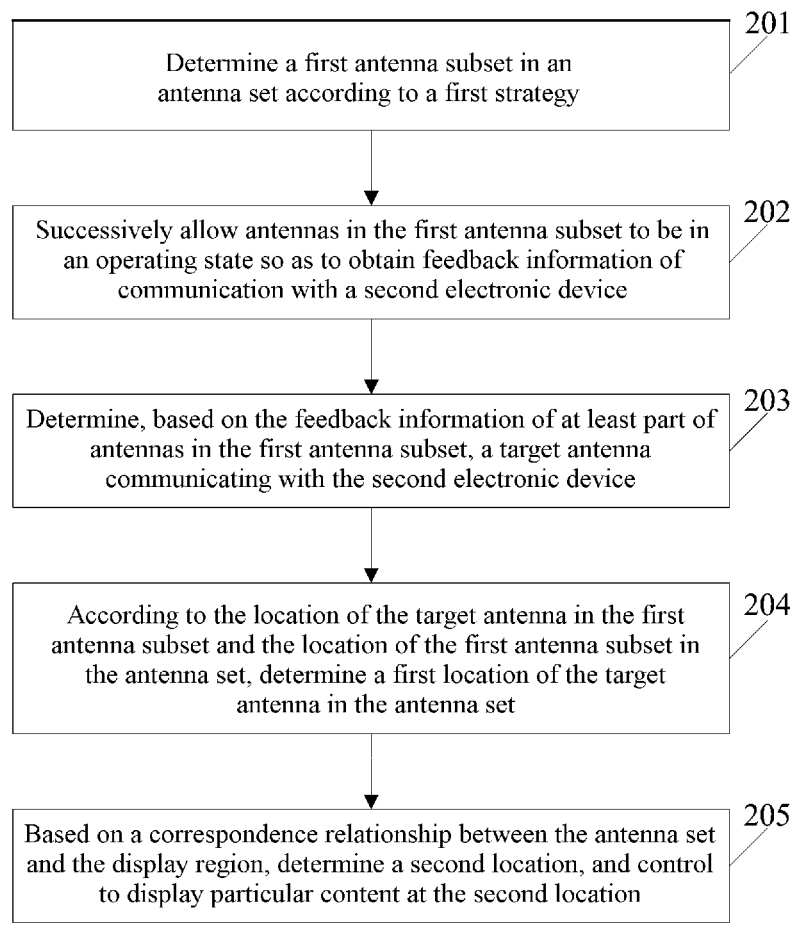
FIG. 3 is a flowchart of an information processing method according to embodiment 2.

An embodiment provides an information processing method. The information processing method is applied in an electronic device. FIG. 3 is a flowchart of the information processing method according an embodiment. As shown in FIG. 3, the information processing method comprises the following.

Step 201: A first antenna subset is determined in an antenna set according to a first strategy, wherein the antenna set is disposed at one side of a display screen of an electronic device; and, the antenna set has no influence on sensing display content on the display screen, and the region where the antenna set is located corresponds to at least part of a display region of the display screen.

The information processing method provided by an embodiment is applied in an electronic device comprising a display screen and an antenna set, wherein the antenna set is disposed at one side of the display screen, and the antenna set has no influence on sensing the display content on the display screen. It may also be understood as: if a first side of the display screen is the side capable of sensing display content, then the antenna set is disposed on a second side of the display screen. It may also be understood as: the antenna set is disposed inside the electronic device and close to the inner side of the display screen, such that a user is unable to see the antenna set, and the display screen has no influence on the communication of antennas in the antenna set. Of course, the antenna set may also be disposed on the second side of the display screen, that is, when a user watches display content on the display screen, the antenna set is closer to the user than the display screen. In an embodiment, the display screen is a display module for displaying content, and the electronic device further comprises a touch module which typically covers the display module for touch operations by a user. In an embodiment, the antenna set covers the display module, and the arrangement of the antenna would not affect the display of the display module. In an embodiment, the region where the antenna set is located may correspond to the display region of the display screen, that is, the region where the antenna set is located corresponds to the whole display region of the display screen. In another implementation, the region where the antenna set is located corresponds to part of the display region of the display screen.

As the execution body of the information processing method provided by an embodiment is the electronic device, in this step, the determining a first antenna subset from an antenna set according to a first strategy is: determining, by the electronic device, the first antenna subset from the antenna set according to the first strategy.

As an implementation, the determining a first antenna subset from an antenna set according to a first strategy includes: determining the first strategy according to display content of the electronic device, and determining the first antenna subset from the antenna set according to the first strategy.

Here, the first strategy is: an antenna set within a first sub-region in the region where the antenna set is located is used as the first antenna subset, wherein the first sub-region is smaller than the region where the antenna set is located; or, an antenna subset with a first density in the antenna set is used as the first antenna subset, wherein the first density is smaller than the density of the antenna set.

In FIG. 2a and FIG. 2b, antenna 1.1 to antenna 1.n and antenna 2.1 to antenna 2.n form an antenna set N. In this illustration, the antenna set N is an antenna array of 2*n. As shown in FIG. 2a, the first strategy is that, in the region where the antenna set N is located, an antenna set within a region where antenna 1.1 to antenna 1.3 and antenna 2.1 to antenna 2.3 are located is selected as a first antenna subset a, and the first antenna subset a is an antenna array of 2*3. It can be understood that, under the first strategy, an antenna set corresponding to a sub-region within the region where the antenna set is located is selected as the first antenna subset. This illustration may be applied in the following scenario: many kinds of content such as discount coupons, text information and the like will be displayed on the display screen of the electronic device, and the discount coupons and text information are displayed in different regions of the display screen; equivalently, the electronic device has at least one functional region in which display content required by a user is displayed. Taking the number of the functional region being 1 in this illustration, as shown in FIG. 2a, the display region corresponding to the region where antenna 1.1 to antenna 1.3 and antenna 2.1 to antenna 2.3 are located is used as a functional region. This functional region displays discount coupons, while other display regions display text information. It can be understood that, the antennas corresponding to the functional region (e.g., the display region for discount coupons) are required to be in an operating state for locating, while the antennas corresponding to a non-functional region (e.g., a display region for text information) are not required to be in an operating state and thus not required for locating.

In another scenario, as shown in FIG. 2b, the first strategy is that 2*N/2 antennas are selected from the antenna set N of 2*n antennas to form a first antenna subset b, and the region where the first antenna subset b is located is the same as the region where the antenna set N is located. It can be understood that, under the second strategy, the range of coverage area of the first antenna subset is the same as that of the antenna set, only the density of the antenna array in the first antenna subset is different from that of the antenna array in the antenna set. For example, in FIG. 2b, the antenna set in the first antenna subset b includes antenna 1.1, antenna 1.3 . . . antenna 1.*n,* and antenna 2.1, antenna 2.3 . . . antenna 2.*n.* That is, in this illustration, antennas at odd positions are used as the first antenna subset b. This illustration may be applied in the following scenario.

The display screen of the electronic device will display a plurality of discount coupons, and the display region occupied by each discount coupon is relatively large or the spacing there-between is relatively large; that is, the electronic device has a plurality of functional regions, and each functional region has a relatively large area or a relatively large spacing. Display content required by a user is displayed in each functional region. Since each functional region has a relatively large area or a relatively large spacing, the precision requirement of the first antenna subset in the operating state is not high. As shown in FIG. 2*b*, taking the antenna set in the antenna subset b including antenna 1.1, antenna 1.3 . . . antenna 1.*n,* and antenna 2.1, antenna 2.3 . . . antenna 2.*n* as an example, the display region corresponding to each antenna within the first antenna subset b is a functional region.

In an embodiment, the first strategy may be preset in the electronic device, and then the first antenna subset is determined in the antenna set according to the preset first strategy. The first strategy may also be generated according to content to be displayed on the display screen of the electronic device and based on attribute parameters of the content to be displayed, wherein the attribute parameters may be template parameters, and the template parameters include display sub-regions and the format of content to be displayed in each display sub-region. The electronic device may generate a first strategy according to the template parameters. In another implementation, a plurality of first strategies may be preset in the electronic device. For example, first strategy 1 is the strategy shown in FIG. 2*a*, while first strategy 2 is the strategy shown in FIG. 2*b*. The electronic device will, according to the content to be displayed on the display screen of the electronic device, choose a strategy which matches the attribute parameters of the content to be displayed, and then determines the first antenna subset from the antenna set according to the selected first strategy.

In various embodiments, the antennas in the antenna set are used for near-field wireless communication. The near-field wireless communication is wireless communication having a communication distance less than a preset threshold, wherein the preset threshold may be set as 20 cm, and the distance between two adjacent antennas in the antenna set may be set as 10 cm. In this scenario, the electronic device may use an antenna subset with a first density of the antenna set as a first antenna subset, so as to facilitate a subsequent determination of the target antenna through feedback information received by a certain antenna. In another implementation, the preset threshold may also be set much lower, that is, a plurality of antennas may be disposed in the functional region of the electronic device, so as to facilitate subsequent determination of the target antenna, i.e., the antenna corresponding to the maximum communication parameter or the antenna corresponding to the communication parameter exceeding a preset threshold in the feedback information received by the plurality of antennas. In these implementations, the antennas in the antenna array may be preferably NFC antennas.

Step 202: Antennas in the first antenna subset are successively allowed to be in an operating state to obtain feedback information of communication with a second electronic device.

Here, the electronic device successively allows the antennas to be in an operating state from the first antenna. As an implementation, the successively allowing antennas to be in an operating state from the first antenna may be as shown in FIG. 2*a*. The electronic device allows antenna 1.1 to be in an operating state, and then allows antenna 1.2 to be in an operating state after receiving feedback information from antenna 1.1, and so on, until each antenna in the first antenna subset a is successively allowed to be in an operating state, and feedback information from each antenna is received. As another implementation, as shown in FIG. 2*b*, the electronic device successively allows the antennas to be in an operating state from antenna 1.1 and antenna 2.1, i.e., simultaneously allows antenna 1.1 and antenna 2.1 to be in an operating state, and then allows antenna 1.2 and antenna 2.2 to be in an operating state after receiving feedback information from antenna 1.1 and antenna 2.1, and so on, until each antenna in the first antenna subset b is successively allowed to be in an operating state, and feedback information from each antenna is received. In other words, in this implementation, in the first antenna subset, antennas are successively allowed to be in an operating state from the antenna in the first row or the first column.

In these implementations, the feedback information of the second electronic device includes communication parameters, and the communication parameters characterize the strength of wireless communication.

Step 203: A target antenna communicating with the second electronic device is determined based on the feedback information of at least part of antennas in the first antenna subset.

Here, the feedback information of the second electronic device includes communication parameters, and the communication parameters characterize the strength of wireless communication. It can be understood as: as an antenna is closer to the second electronic device, the strength of wireless communication characterized by the communication parameter received by the antenna becomes stronger; correspondingly, as an antenna is farther away from the second electronic device, the strength of wireless communication characterized by the communication parameter received by the antenna becomes weaker. Based on this, as a first implementation, the antenna having the maximum communication parameter, i.e., the antenna closest to the second electronic device, will be determined from the feedback information received by the first antenna subset, and the antenna is the target antenna. As a second implementation, at least one antenna having a communication parameter exceeding a first preset threshold will be determined from the feedback information received by the first antenna subset, and the at least one antenna is the target antenna. As a third implementation, feedback information of antennas is successively received in the process of successively allowing the antennas to be in an operating state; when it is determined that the communication parameter in the feedback information of an antenna reaches a second preset threshold, the antenna will be determined as the target antenna. This implementation is suitable for the case where there is one second electronic device, i.e., the scenario where only one second electronic device communicates with the electronic device.

Step 204: According to the location of the target antenna in the first antenna subset and the location of the first antenna subset in the antenna set, a first location of the target antenna in the antenna set is determined.

In this embodiment, the electronic device stores an array set of the relative location relationship of each antenna in the antenna set shown in FIG. 2a or FIG. 2b, and the array set includes an identifier for each antenna. It may be understood as: the electronic device also stores an array subset of the relative location relationship of each antenna in the first antenna subset, and the array subset includes an identifier for each antenna in the first antenna subset. Taking FIG. 2a as an example, after obtaining the target antenna (for example, antenna 1.2), the electronic device will determine, in the array subset (i.e., the first antenna subset a), the location of the target antenna (for example, antenna 1.2) in the first antenna subset (i.e., the first antenna subset a) based on the identifier of the target antenna (e.g., antenna 1.2), and a first location of the target antenna (for example, antenna 1.2) in the antenna set based on the location of the first antenna subset in the antenna set. In another implementation, after obtaining the target antenna (for example, antenna 1.2), the electronic device may also determine directly, in the stored array set, a first location of the target antenna (e.g., antenna 1.2) in the antenna set directly according to the identifier for the target antenna (for example, antenna 1.2). The first location may be represented by the coordinates based on the region where the antenna set is located.

Step 205: Based on a correspondence relationship between the antenna set and the display region, a second location will be determined, and particular content to be displayed at the second location will be controlled; the second location being the location in the display region which corresponds to the first location.

Here, the region where the antenna set is located corresponds to at least part of the display region of the display screen. In an implementation, the region where the antenna set is located corresponds to the whole display region of the display screen. In another implementation, the region where the antenna set is located corresponds to part of the display region of the display screen. Regardless of which implementation, there is a correspondence relationship between the region where the antenna set is located and the display region of the display screen. In practical applications, the correspondence relationship may be realized by a correspondence relationship between point coordinates in the antenna set and point coordinates in the display region. For example, the coordinates (X1, Y1) of the region where the antenna set is located correspond to the coordinates (x1, y1) of the display region, and the coordinates (X2, Y2) of the region where the antenna set is located correspond to the coordinates (x2, y2) of the display region, and so on. In this step, based on the correspondence relationship, by looking up in the correspondence relationship using the coordinate values of the first location, the coordinate values in the display region corresponding to the coordinate values of the first location are obtained, and the coordinate values in the display region will be determined as the second location. Then, particular content will be controlled to be displayed at the second location. Here, taking downloading discount coupons as an example, when a plurality of discount coupons are displayed on the electronic device, it is determined that the discount coupon at the second location needs to be downloaded, and then the discount coupon is downloaded. At the completion of downloading, for example, "DOWNLOAD COMPLETED" may be displayed at the second location.

By adopting the technical solutions provided by an embodiment, on one hand, the number of enabled antennas is reduced through the first strategy, and the polling time of antennas is thus reduced; on the other hand, the time required for determining a target antenna is reduced, and the locating speed of a second electronic device (e.g., a smartphone) is thus increased. Furthermore, display of a particular content at a location (i.e., a second location) which is closest to the second electronic device is realized, which is convenient for the second electronic device to download the display content of the electronic device through a near field wireless communication function (e.g., NFC), and thus the user experience is greatly improved.

Embodiment 3

Figure 4:
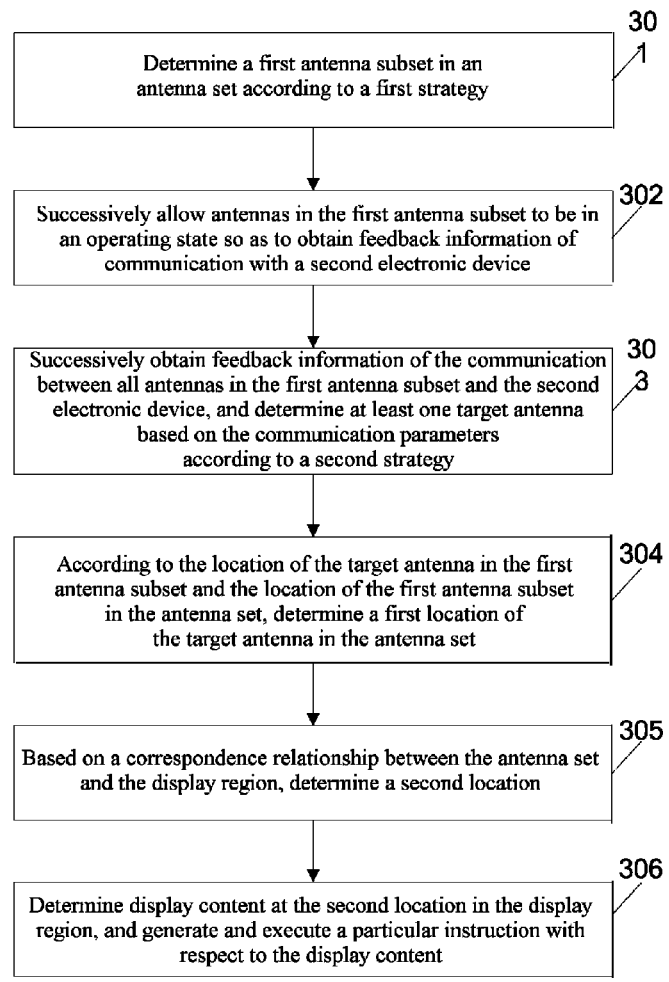
FIG. 4 is a flowchart of an information processing method according to embodiment 3.

An embodiment provides an information processing method. The information processing method is applied in an electronic device. FIG. 4 is a flowchart of the information processing method according to an embodiment. As shown in FIG. 4, the information processing method comprises the following.

Step 301: A first antenna subset is determined from an antenna set according to a first strategy, wherein the antenna set is disposed at one side of a display screen of an electronic device; and, the antenna set has no influence on sensing display content on the display screen, and the region where the antenna set is located corresponds to at least part of a display region of the display screen.

The information processing method provided by an embodiment is applied in an electronic device comprising a display screen and an antenna set, wherein the antenna set is disposed on one side of the display screen, and the antenna set has no influence on sensing the display content on the display screen. It may also be understood as: if a first side of the display screen is the side capable of sensing display content, then the antenna set is disposed on a second side of the display screen. It may also understood as: the antenna set is disposed inside the electronic device and close to the inner side of the display screen, such that a user is unable to see the antenna set and the display screen has no influence on the communication of antennas in the antenna set. Of course, the antenna set may also be disposed on the second side of the display screen, that is, when a user watches display content on the display screen, the antenna set is closer to the user than the display screen. In an embodiment, the display screen is a display module for displaying content, and the electronic device further comprises a touch module which typically covers the display module for touch operations by a user. In an embodiment, the antenna set covers the display module, and the arrangement of the antenna set would not affect the display of the display module. In an embodiment, the region where the antenna set is located may correspond to the display region of the display screen, that is, the region where the antenna set is located corresponds to the whole display region of the display screen. In another implementation, the region where the antenna set is located corresponds to part of the display region of the display screen.

As the execution body of the information processing method provided by an embodiment is the electronic device, in this step, the determining a first antenna subset from an antenna set according to a first strategy is: determining, by the electronic device, the first antenna subset in the antenna set according to the first strategy.

As an implementation, the determining a first antenna subset in an antenna set according to a first strategy includes: determining the first strategy according to display content of the electronic device, and determining the first antenna subset in the antenna set according to the first strategy.

Here, the first strategy is: an antenna set within a first sub-region in the region where the antenna set is located is used as the first antenna subset, wherein the first sub-region is smaller than the region where the antenna set is located;

or, an antenna subset with a first density in the antenna set is used as the first antenna subset, wherein the first density is smaller than the density of the antenna set.

In FIG. 2a and FIG. 2b, antenna 1.1 to antenna 1.n and antenna 2.1 to antenna 2.n form an antenna set N. In this illustration, the antenna set N is an antenna array of 2*n. As shown in FIG. 2a, the first strategy is that, in the region where the antenna set N is located, an antenna set within a region where antenna 1.1 to antenna 1.3 and antenna 2.1 to antenna 2.3 are located is selected as a first antenna subset a, and the first antenna subset a is an antenna array of 2*3. It can be understood that, under the first strategy, an antenna set corresponding to a sub-region within the region where the antenna set is located is selected as the first antenna subset. This illustration may be applied in the following scenario.

Many kinds of content such as discount coupons, text information and the like will be displayed on the display screen of the electronic device, and the discount coupons and text information are displayed in different regions of the display screen; equivalently, the electronic device has at least one functional region in which display content required by a user is displayed. Taking the number of the functional region being 1 in this illustration, as shown in FIG. 2a, the display region corresponding to the region where antenna 1.1 to antenna 1.3 and antenna 2.1 to antenna 2.3 are located is used as a functional region. This functional region displays discount coupons, while other display regions display text information. It can be understood that, the antennas corresponding to the functional region (e.g., the display region of discount coupons) are required to be in an operating state for locating, while the antennas corresponding to a non-functional region (e.g., a display region of text information) are not required to be in an operating state and thus not required for locating.

In another scenario, as shown in FIG. 2b, the first strategy is that 2*N/2 antennas are selected from the antenna set N, which comprise 2*n antennas, to form a first antenna subset b, and the region where the first antenna subset b is located is the same as the region where the antenna set N is located. It can be understood that, under the second strategy, the range of coverage area of the first antenna subset is the same as that of the antenna set, only the density of the antenna array in the first antenna subset is different from that of the antenna array in the antenna set. For example, in FIG. 2b, the antenna set in the first antenna subset b includes antenna 1.1, antenna 1.3 . . . antenna 1.n, and antenna 2.1, antenna 2.3 . . . antenna 2.n. That is, in this illustration, antennas at odd positions are used as the first antenna subset b. This illustration may be applied in the following scenario.

The display screen of the electronic device will display a plurality of discount coupons, and the display region occupied by each discount coupon is relatively large or the spacing there-between is relatively large; that is, the electronic device has a plurality of functional regions, and each functional region has a relatively large area or a relatively large spacing. Display content required by a user is displayed in each functional region. Since each functional region has a relatively large area or a relatively large spacing, the precision requirement of the first antenna subset in operation in the antenna set is not high. As shown in FIG. 2b, taking the antenna set in the antenna subset b including antenna 1.1, antenna 1.3 . . . antenna 1.n, and antenna 2.1, antenna 2.3 . . . antenna 2.n as an example, the display region corresponding to each antenna within the first antenna subset b is a functional region.

In an embodiment, the first strategy may be preset in the electronic device, and then the first antenna subset is determined in the antenna set according to the preset first strategy. The first strategy may also be generated according to content to be displayed on the display screen of the electronic device and based on attribute parameters of the content to be displayed, wherein the attribute parameters may be template parameters, and the template parameters include display sub-regions and the format of content to be displayed in each display sub-region. The electronic device may generate a first strategy according to the template parameters. In another implementation, a plurality of first strategies may be preset in the electronic device. For example, first strategy 1 is the strategy shown in FIG. 2a, while first strategy 2 is the strategy shown in FIG. 2b. The electronic device will, according to the content to be displayed on the display screen of the electronic device, choose a first strategy which matches the attribute parameters of the content to be displayed, and then determines the first antenna subset from the antenna set according to the selected first strategy.

In various embodiments, the antennas in the antenna set are used for near-field wireless communication. The near-field wireless communication is wireless communication having a communication distance less than a preset threshold, wherein the preset threshold may be set as 20 cm, and the distance between two adjacent antennas in the antenna set may be set as 10 cm. In this scenario, the electronic device may use an antenna subset with a first density in the antenna set as a first antenna subset, so as to facilitate subsequent determination of the target antenna through the feedback information received by a certain antenna. In another implementation, the preset threshold may also be set much lower, that is, a plurality of antennas may be disposed in the functional region of the electronic device, so as to facilitate subsequent determination of the target antenna, i.e., the antenna corresponding to the maximum communication parameter or the antenna corresponding to the communication parameter exceeding a preset threshold in the feedback information received by the plurality of antennas. In these implementations, the antennas in the antenna array may be preferably NFC antennas.

Step 302: Antennas in the first antenna subset are successively allowed to be in an operating state to obtain feedback information of communication with a second electronic device.

Here, the electronic device successively allows antennas to be in an operating state from the first antenna. As an implementation, the successively allowing antennas to be in an operating state from the first antenna may be as shown in FIG. 2a. The electronic device allows antenna 1.1 to be in an operating state, and then allows antenna 1.2 to be in an operating state after receiving feedback information from antenna 1.1, and so on, until each antenna in the first antenna subset a is successively allowed to be in an operating state, and feedback information from each antenna is received. As another implementation, as shown in FIG. 2b, the electronic device successively allows antennas to be in an operating state from antenna 1.1 and antenna 2.1, i.e., simultaneously allows antenna 1.1 and antenna 2.1 to be in an operating state, and then allows antenna 1.2 and antenna 2.2 to be in an operating state after receiving feedback information from antenna 1.1 and antenna 2.1, and so on, until each antenna in the first antenna subset b is successively allowed to be in an operating state, and feedback information from each antenna is received. In other words, in this implementation, in the first antenna subset, antennas are successively allowed to be in an operating state from the antenna in the first row or the first column.

In these implementations, the feedback information of the second electronic device includes communication parameters, and the communication parameters characterize the strength of wireless communication.

Step 303: Feedback information of the communication with the second electronic device is successively obtained for all antennas in the first antenna subset, and at least one target antenna will be determined based on the communication parameters according to a second strategy, wherein the feedback information includes communication parameters.

Here, the determining at least one target antenna based on the communication parameters according to a second strategy comprises: based on the communication parameters of all antennas in the first antenna subset, selecting an antenna corresponding to the maximum communication parameter of the communication parameters as the target antenna; or, based on the communication parameters of all antennas in the first antenna subset, selecting an antenna corresponding to the communication parameter of the communication parameters that exceeds a first preset threshold as the target antenna.

Here, the communication parameters characterize the strength of wireless communication. It can also be understood that, as an antenna is closer to the second electronic device, the strength of wireless communication characterized by the communication parameter received by the antenna becomes stronger; correspondingly, as an antenna is farther away from the second electronic device, the strength of wireless communication characterize d by the communication parameter received by the antenna becomes weaker.

Based on this, a first application scenario of the second strategy is: only one second electronic device is in wireless communication with antennas in the first antenna subset in the electronic device. After the feedback information of the antennas in the first antenna subset is successively obtained, based on the communication parameters in the feedback information obtained for all antennas in the first antenna subset, an antenna having the maximum communication parameter will be selected as the target antenna.

A second application scenario of the second strategy is: at least two second electronic devices are in wireless communication with the antennas in the first antenna subset in the electronic device. After the feedback information of the antennas in the first antenna subset is successively obtained, the antennas with the communication parameter exceeding a first preset threshold will be selected as the target antennas.

Step 304: According to the location of the target antenna in the first antenna subset and the location of the first antenna subset in the antenna set, a first location of the target antenna in the antenna set is determined.

In an embodiment, the electronic device stores an array set of the relative location relationship of each antenna in the antenna set shown in FIG. 2a or FIG. 2b, and the array set includes an identifier for each antenna. It may be understood as: the electronic device also stores an array subset of the relative location relationship of each antenna in the first antenna subset, and the array subset includes an identifier for each antenna in the first antenna subset. Taking FIG. 2a as an example, after obtaining the target antenna (for example, antenna 1.2), the electronic device will determine, in the array subset (i.e., the first antenna subset a), the location of the target antenna (for example, antenna 1.2) in the first antenna subset (i.e., the first antenna subset a) based on the identifier of the target antenna (e.g., antenna 1.2), and a first location of the target antenna (for example, antenna 1.2) in the antenna set based on the location of the first antenna subset in the antenna set. In another implementation, after obtaining the target antenna (for example, antenna 1.2), the electronic device may also determine directly, in the stored array set, a first location of the target antenna (e.g., antenna 1.2) in the antenna set directly according to the identifier for the target antenna, for example antenna 1.2). The first location may be represented by the coordinates based on the region where the antenna set is located.

Step 305: Based on a correspondence relationship between the antenna set and the display region, a second location will be determined, wherein the second location is the location in the display region which corresponds to the first location.

Here, the region where the antenna set is located corresponds to at least one part of the display region of the display screen. In an implementation, the region where the antenna set is located corresponds to the whole display region of the display screen. In another implementation, the region where the antenna set is located corresponds to a part of the display region of the display screen. Regardless of which implementation, there is a correspondence relationship between the region where the antenna set is located and the display region of the display screen. In practical applications, the correspondence relationship may be realized by a correspondence relationship between point coordinates in the antenna set and point coordinates in the display region. For example, the coordinates (X1, Y1) of the region where the antenna set is located correspond to the coordinates (x1, y1) of the display region, and the coordinates (X2, Y2) of the region where the antenna set is located are corresponding to the coordinates (x2, y2) of the display region, and so on. In this step, based on the correspondence relationship, by looking up in the correspondence relationship using the coordinate values of the first location, the coordinate values in the display region corresponding to the coordinate values of the first location are obtained, and the coordinate values in the display region will be determined as the second location.

Step 306: Display content at the second location in the display region is determined, and a particular instruction with respect to the display content is generated and executed.

In an embodiment, the display content at the second location is at least part of the original display content on the display screen of the electronic device. Taking the electronic device being a smartphone as an example, when the electronic device is displaying an address book, and after the display content at the second location in the display region is determined, generation of a particular instruction is triggered, for example, presenting a function key "SYNCHRONIZE." After it is detected that a user presses the function key "SYNCHRONIZE," the particular instruction is executed, and the electronic device synchronizes the address book to the second electronic device.

By adopting the technical solutions provided by an embodiment, on one hand, the number of enabled antennas is reduced through the first strategy, and the polling time of antennas is thus reduced. On the other hand, the time required for determining a target antenna is reduced, and the positioning speed of a second electronic device (e.g., a smartphone) is increased. Furthermore, generation of a function key is triggered successfully on the display screen of the electronic device at the location (i.e., the second location) which is closest to the second electronic device is realized, such that it is convenient for the electronic device to enable a function corresponding to the function key through near field wireless communication function (e.g., NFC), and the user experience is greatly improved.

Embodiment 4

Figure 5:
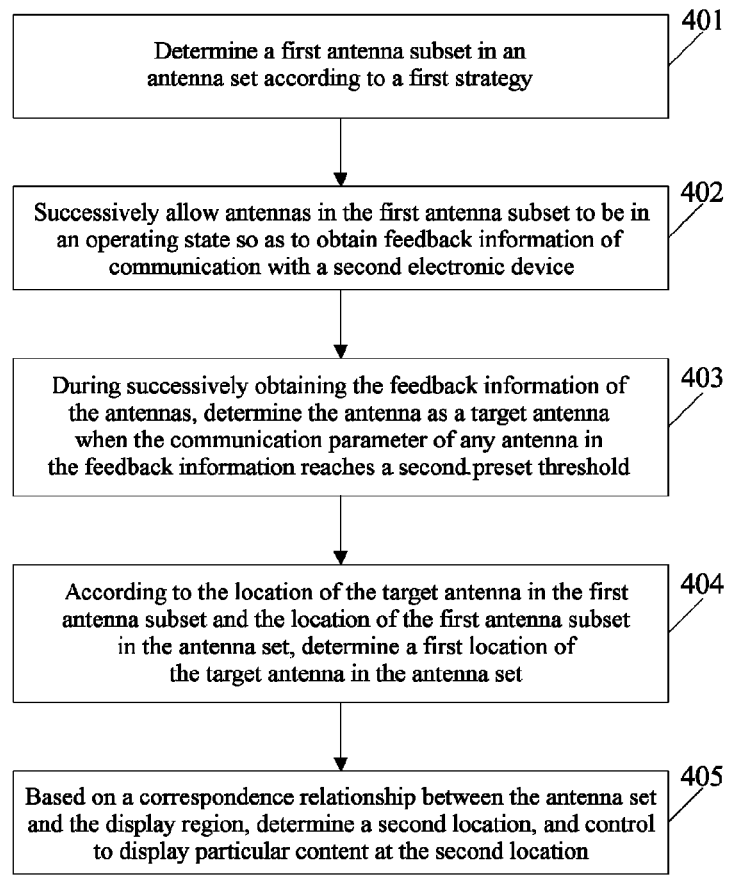
FIG. 5 is a flowchart of an information processing method according to embodiment 4.

FIG. 5 is a flowchart of the information processing method according to an embodiment. As shown in FIG. 5, the information processing method comprises the following.

Step 401: A first antenna subset is determined in an antenna set according to a first strategy, wherein the antenna set is disposed at one side of a display screen of an electronic device; and, the antenna set has no influence on sensing display content on the display screen, and the region where the antenna set is located corresponds to at least part of a display region of the display screen.

The information processing method provided by an embodiment is applied in an electronic device comprising a display screen and an antenna set, wherein the antenna set is disposed at one side of the display screen, and the antenna set has no influence on sensing the display content on the display screen. It may be understood as: if a first side of the display screen is the side capable of sensing display content, then the antenna set is disposed on a second side of the display screen. It may also be understood as: the antenna set is disposed inside the electronic device and close to the inner side of the display screen, such that a user is unable to see the antenna set and the display screen has no influence on the communication of antennas in the antenna set. Of course, the antenna set may also be disposed on the second side of the display screen, that is, when a user watches display content on the display screen, the antenna set is closer to the user than the display screen. In an embodiment, the display screen is a display module for displaying content, and the electronic device further comprises a touch module which typically covers the display module for touch operations by a user. In an embodiment, the antenna set covers the display module, and the arrangement of the antenna set would not affect the display of the display module. In an embodiment, the region where the antenna set is located may correspond to the display region of the display screen, that is, the region where the antenna set is located corresponds to the whole display region of the display screen. In another implementation, the region where the antenna set is located corresponds to part of the display region of the display screen.

As the execution body of the information processing method provided by an embodiment is the electronic device, in this step, the determining a first antenna subset from an antenna set according to a first strategy is: determining, by the electronic device, the first antenna subset from the antenna set according to the first strategy.

As an implementation, the determining a first antenna subset in an antenna set according to a first strategy includes: determining the first strategy according to display content of the electronic device, and determining the first antenna subset in the antenna set according to the first strategy.

Here, the first strategy is: an antenna set within a first sub-region in the region where the antenna set is located is used as the first antenna subset, wherein the first sub-region is smaller than the region where the antenna set is located; or, an antenna subset with a first density in the antenna set is used as the first antenna subset, wherein the first density is smaller than the density of the antenna set.

In FIG. 2a and FIG. 2b, antenna 1.1 to antenna 1.n and antenna 2.1 to antenna 2.n form an antenna set N. In this illustration, the antenna set N is an antenna array of 2*n. As shown in FIG. 2a, the first strategy is that, in the region where the antenna set N is located, an antenna set within a region where antenna 1.1 to antenna 1.3 and antenna 2.1 to antenna 2.3 are located is selected as a first antenna subset a, and the first antenna subset a is an antenna array of 2*3. It can be understood that, under the first strategy, an antenna set corresponding to a sub-region within the region where the antenna set is located is selected as the first antenna subset. This illustration may be applied in the following scenario.

Many kinds of content such as discount coupons, text information and the like will be displayed on the display screen of the electronic device, and the discount coupons and text information are displayed in different regions of the display screen; equivalently, the electronic device has at least one functional region in which display content required by a user is displayed. Taking the number of the functional region being 1 in this illustration, as shown in FIG. 2a, the display region corresponding to the region where antenna 1.1 to antenna 1.3 and antenna 2.1 to antenna 2.3 are located is used as a functional region. This functional region displays discount coupons, while other display regions display text information. It can be understood that, the antennas corresponding to the functional region (e.g., the display region of discount coupons) are required to be in an operating state for locating, while the antennas corresponding to a non-functional region (e.g., a display region of text information) are not required to be in an operating state and thus not required for locating.

In another scenario, as shown in FIG. 2b, the first strategy is that 2*N/2 antennas are selected from the antenna set N, which comprise 2*n antennas, to form a first antenna subset b, and the region where the first antenna subset b is located is the same as the region where the antenna set N is located. It can be understood that, under the second strategy, the range of coverage area of the first antenna subset is the same as that of the antenna set, only the density of the antenna array in the first antenna subset is different from that of the antenna array in the antenna set. For example, in FIG. 2b, the antenna set in the first antenna subset b includes antenna 1.1, antenna 1.3 . . . antenna 1.n, and antenna 2.1, antenna 2.3 . . . antenna 2.n. That is, in this illustration, antennas at odd positions are used as the first antenna subset b. This illustration may be applied in the following scenario.

The display screen of the electronic device will display a plurality of discount coupons, and the display region occupied by each discount coupon is relatively large or the spacing there-between is relatively large; that is, the electronic device has a plurality of functional regions, and each functional region has a relatively large area or a relatively large spacing. Display content required by a user is displayed in each functional region. Since each functional region has a relatively large area or a relatively large spacing, the precision requirement of the first antenna subset in operation in the antenna set is not high. As shown in FIG. 2b, taking the antenna set in the antenna subset b including antenna 1.1, antenna 1.3 . . . antenna 1.n, and antenna 2.1, antenna 2.3 . . . antenna 2.n as an example, the display region corresponding to each antenna within the first antenna subset b is a functional region.

In this embodiment, the first strategy may be preset in the electronic device, and then the first antenna subset is determined in the antenna set according to the preset first strategy. The first strategy may also be generated according to content to be displayed on the display screen of the electronic device and based on attribute parameters of the content to be displayed, wherein the attribute parameters may be template parameters, and the template parameters include display sub-regions and the format of content to be displayed in each display sub-region. The electronic device may generate a first strategy according to the template parameters. In another implementation, a plurality of first strategies may be preset in the electronic device. For example, first strategy 1 is the strategy shown in FIG. 2*a*, while first strategy 2 is the strategy shown in FIG. 2*b*. The electronic device will, according to the content to be displayed on the display screen of the electronic device, choose a first strategy which matches the attribute parameters of the content to be displayed, and then determines the first antenna subset from the antenna set according to the selected first strategy.

In various embodiments, the antennas in the antenna set are used for near-field wireless communication. The near-field wireless communication is wireless communication having a communication distance less than a preset threshold, wherein the preset threshold may be set as 20 cm, and the distance between two adjacent antennas in the antenna set may be set as 10 cm. In this scenario, the electronic device may use an antenna subset with a first density in the antenna set as a first antenna subset, so as to facilitate subsequent determination of the target antenna through the feedback information received by a certain antenna. In another implementation, the preset threshold may also be set much lower, that is, a plurality of antennas may be disposed in the functional region of the electronic device, so as to subsequent determination of the a target antenna, i.e., the antenna corresponding to the maximum communication parameter or the antenna corresponding to the communication parameter exceeding a preset threshold in the feedback information received by the plurality of antennas. In these implementations, the antennas in the antenna array may be preferably NFC antennas.

Step 402: Antennas in the first antenna subset are successively allowed to be in an operating state to obtain feedback information of communication with a second electronic device.

Here, the electronic device successively allows antennas to be in an operating state from the first antenna. As an implementation, the successively allowing antennas to be in an operating state from the first antenna may be as shown in FIG. 2*a*. The electronic device allows antenna 1.1 to be in an operating state, and then allows antenna 1.2 to be in an operating state after receiving feedback information from antenna 1.1, and so on, until each antenna in the first antenna subset a is successively allowed to be in an operating state, and feedback information from each antenna is received. As another implementation, as shown in FIG. 2*b*, the electronic device successively allows antennas to be in an operating state from antenna 1.1 and antenna 2.1, i.e., simultaneously allows antenna 1.1 and antenna 2.1 to be in an operating state, and then allows antenna 1.2 and antenna 2.2 to be in an operating state after receiving feedback information from antenna 1.1 and antenna 2.1, and so on, until each antenna in the first antenna subset b is successively allowed to be in an operating state, and feedback information from each antenna is received. In other words, in this implementation, in the first antenna subset, antennas are successively allowed to be in an operating state from the antenna in the first row or the first column.

In these implementations, the feedback information of the second electronic device includes communication parameters, and the communication parameters characterize the strength of wireless communication.

Step 403: During successively obtaining the feedback information of the antennas, when the communication parameter of any antenna in the feedback information reaches a second preset threshold, the antenna will be determined as a target antenna.

An application scenario of an embodiment is: only one second electronic device is in wireless communication with the antennas in the first antenna subset in the electronic device. In this scenario, for example, the first antenna subset includes 10 antennas, and during successively obtaining the feedback information of the antennas, antennas 1, 2 and 3 have no feedback information; while antennas 4, 5 and 6 receive feedback information, and the communication parameter of the feedback information of antenna 6 reaches the second preset threshold, then the antenna 6 will be determined as the target antenna, and antennas 7, 8, 9 and 10 would not participate in rolling any more. In other words, after the feedback information of the antenna 6 is received, the electronic device would not allow the antennas 7, 8, 9 and 10 to be in an operation state, and the polling is completed.

Step 404: According to the location of the target antenna in the first antenna subset and the location of the first antenna subset in the antenna set, a first location of the target antenna in the antenna set is determined.

In an embodiment, the electronic device stores an array set of the relative location relationship of each antenna in the antenna set shown in FIG. 2*a* or FIG. 2*b*, and the array set includes an identifier for each antenna. It may be understood as: the electronic device also stores an array subset of the relative location relationship of each antenna in the first antenna subset, and the array subset includes an identifier for each antenna in the first antenna subset. Taking FIG. 2*a* as an example, after obtaining the target antenna (for example, antenna 1.2), the electronic device will determine, in the array subset (i.e., the first antenna subset a), the location of the target antenna (for example, antenna 1.2) in the first antenna subset (i.e., the first antenna subset a) based on the identifier for the target antenna (for example, antenna 1.2), and a first location of the target antenna (for example, antenna 1.2) in the antenna set based on the location of the first antenna subset in the antenna set. In another implementation, after obtaining the target antenna (for example, antenna 1.2), the electronic device may also determine directly, in the stored array set, a first location of the target antenna (e.g., antenna 1.2) in the antenna set directly according to the identifier for the target antenna (directly, antenna 1.2). The first location may be represented by the coordinates based on the region where the antenna set is located.

Step 405: Based on a correspondence relationship between the antenna set and the display region, a second location will be determined, and particular content to be displayed at the second location will be controlled; wherein the second location is the location in the display region which corresponds to the first location in the display region.

Here, the region where the antenna set is located corresponds to at least part of the display region of the display screen. In an implementation, the region where the antenna set is located corresponds to the whole display region of the display screen. In another implementation, the region where the antenna set is located corresponds to part of the display region of the display screen. Regardless of which implementation, there is a correspondence relationship between the region where the antenna set is located and the display region of the display screen. In practical applications, the correspondence relationship may be realized by a correspondence relationship between point coordinates in the antenna set and point coordinates in the display region. For example, the coordinates (X1, Y1) of the region where the antenna set is located correspond to the coordinates (x1, y1) of the display region, and the coordinates (X2, Y2) of the region where the antenna set is located correspond to the coordinates (x2, y2) of the display region, and so on. In this step, based on the correspondence relationship, by looking up in the correspondence relationship using the coordinate values of the first location, the coordinate values in the display region corresponding to the coordinate values of the first location are obtained, and the coordinate values in the display region are determined as the second location. Then, particular content will be controlled to be displayed at the second location. Here, taking downloading discount coupons as an example, it is determined that the discount coupon at the second location needs to be downloaded, then at the completion of downloading, particular content (for example, "DOWNLOAD COMPLETED") is displayed at the second location.

By adopting the technical solutions provided by an embodiment, on one hand, the number of enabled antennas is reduced through the first strategy, and the polling time of antennas is thus reduced. On the other hand, the time required for determining a target antenna is reduced, and the locating speed of a second electronic device (e.g., a smartphone) is thus increased. Furthermore, display of a particular content at a location (i.e., a second location) which is closest to the second electronic device is realized, which is convenient for the second electronic device to download the display content of the electronic device through a near field wireless communication function (e.g., NFC), and thus the user experience is greatly improved.

Embodiment 5

Figure 6:
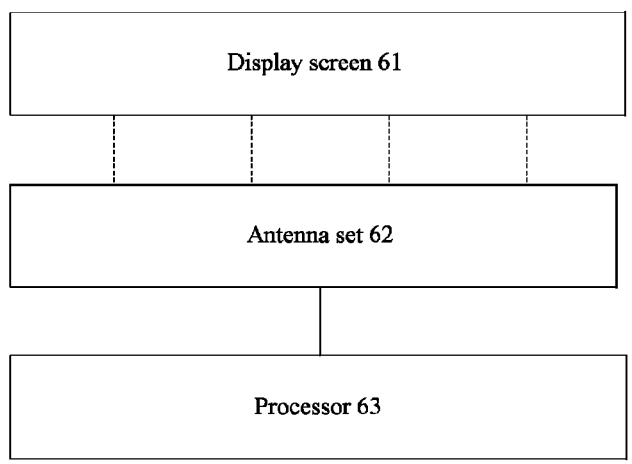
FIG. 6 is a composition structure diagram of an electronic device according to an embodiment.

FIG. 6 is the structure diagram of an electronic device according to an embodiment. As shown in FIG. 6, the electronic device comprises: an antenna set 62, a display screen 61 and a processor 63, wherein: the display screen 61 is used for displaying content; the antenna set 62 includes at least two antennas and is disposed at one side of the display screen 61, wherein the antenna set 62 has no influence on sensing display content of the display screen 61, and the region where the antenna set 62 is located corresponds to at least part of a display region of the display screen 61; and the processor 63 is used to determine a first antenna subset in the antenna set 62 according to a first strategy; successively allowing antennas in the first antenna subset to be in an operating state so as to obtain feedback information of communication with a second electronic device; and, determining, based on the feedback information of at least part of the antennas in the first antenna subset, a target antenna communicating with the second electronic device.

In particular, the first strategy is: an antenna set within a first sub-region in the region where the antenna set is located is used as the first antenna subset, wherein the first sub-region is smaller than the region where the antenna set is located; or, an antenna subset with a first density in the antenna set is used as the first antenna subset, the first density being smaller than the density of the antenna set.

Figure 7:
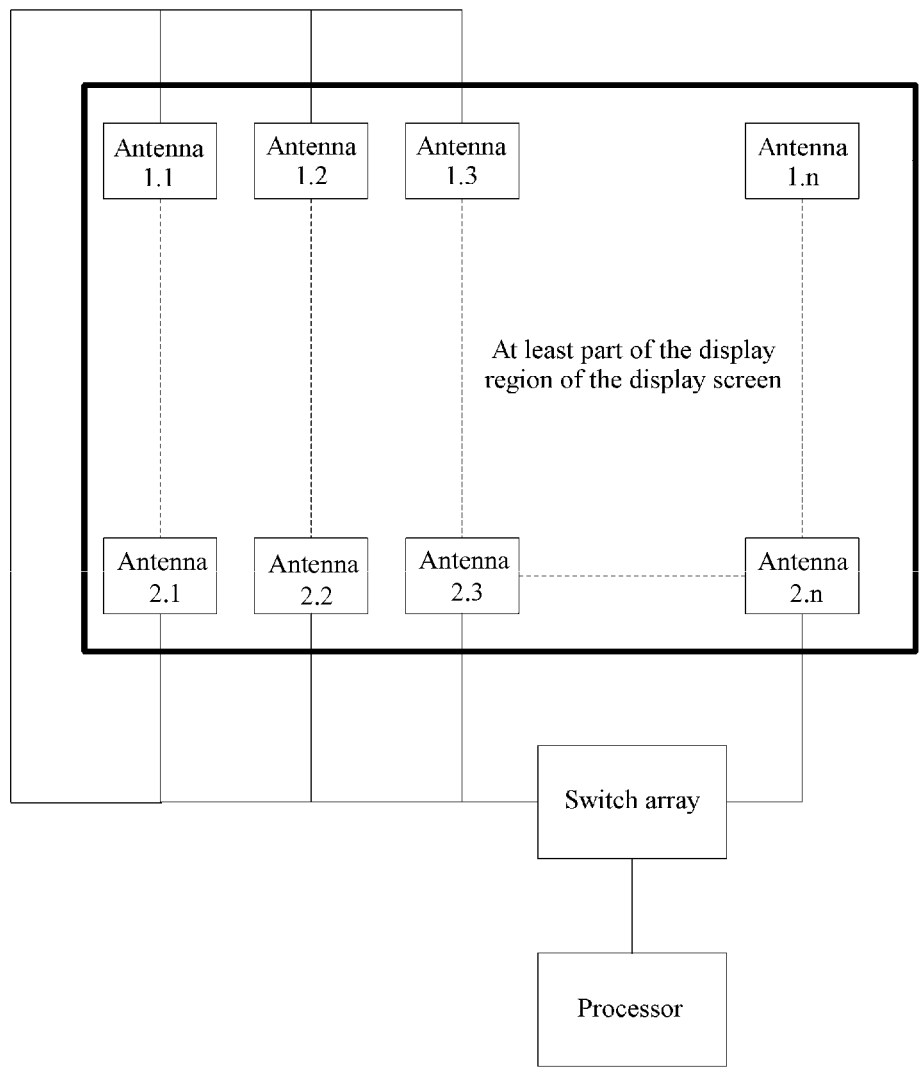
FIG. 7 is a scenario diagram of an electronic device according to an embodiment.

FIG. 7 is a scenario diagram of the electronic device according to an embodiment. As shown in FIG. 7, in practical applications, the electronic device further comprises a switch array. The switch array includes the same number of switches as the antennas in the antenna set, and each switch is connected to one antenna. After the processor determines a first antenna subset in the antenna set according to the first strategy, the processor successively controls the switch corresponding to each antenna in the first antenna subset to be in a connecting state in order to successively allow the antennas to be in an operating state, so as to obtain feedback information of the communication with a second electronic device.

Those skilled in the art should understand that, the functions of each processing unit in the electronic device provided by an embodiment may be understood with reference to the relevant description of the above-mentioned information processing method.

Embodiment 6

As shown in FIG. 6, in an embodiment, the electronic device comprises: an antenna set 62, a display screen 61 and a processor 63, wherein: the display screen 61 is used for displaying content; the antenna set 62 includes at least two antennas and is disposed at one side of the display screen 61, wherein the antenna set 62 has no influence on sensing display content of the display screen 61, and the region where the antenna set 62 is located corresponds to at least part of a display region of the display screen 61; and wherein the processor 63 is used to determine a first antenna subset in the antenna set 62 according to a first strategy; successively allowing antennas in the first antenna subset to be in an operating state so as to obtain feedback information of communication with a second electronic device; and, determining, based on the feedback information of at least part of antennas in the first antenna subset, a target antenna communicating with the second electronic device. The processor is further used to: after determining, based on the feedback information of at least part of antennas in the first antenna subset, determine a target antenna communicating with the second electronic device, according to the location of the target antenna in the first antenna subset and the location of the first antenna subset in the antenna set 62, determine a first location of the target antenna in the antenna set 62; based on a correspondence relationship between the antenna set 62 and the display region of the display screen 61, determine a second location, the second location being the location in the display region of the display screen 61 corresponding to the first location; and, control to display particular content at the second location of the display screen 61.

In particular, the first strategy is: an antenna set within a first sub-region in the region where the antenna set is located is used as the first antenna subset, wherein the first sub-region is smaller than the region where the antenna set is located; or, an antenna subset with a first density in the antenna set is used as the first antenna subset, the first density being smaller than the density of the antenna set.

As an implementation, as shown in FIG. 7, in practical applications, the electronic device further includes a switch array. The switch array includes the same number of switches as the antennas in the antenna set, and each switch is connected to one antenna. After the processor determines the first antenna subset from the antenna set according to the first strategy, the processor successively controls the switch corresponding to each antenna in the first antenna subset to be in a connecting state in order to successively allow the antennas to be in an operating state, so as to obtain feedback information of the communication with the second electronic device.

Those skilled in the art should understand that, the functions of each processing unit in the electronic device provided by an embodiment may be understood with reference to the relevant description of the above-mentioned information processing method.

Embodiment 7

As shown in FIG. 6, in an embodiment, the electronic device comprises: an antenna set 62, a display screen 61 and a processor 63, wherein: the display screen 61 is used for displaying content; the antenna set 62 includes at least two antennas and is disposed at one side of the display screen 61, wherein the antenna set 62 has no influence on sensing display content of the display screen 61, and a region where the antenna set 62 is located corresponds to at least part of a display region of the display screen 61; and the processor 63 is used to determine a first antenna subset in the antenna set 62 according to a first strategy; successively allowing antennas in the first antenna subset to be in an operating state so as to obtain feedback information of communication with a second electronic device, wherein the feedback information includes communication parameters; and, determining at least one target antenna based on the communication parameters according to a second strategy. The processor is further used to: after determining, based on the feedback information of at least part of antennas in the first antenna subset, determine a target antenna communicating with the second electronic device, determine, according to the location of the target antenna in the first antenna subset and the location of the first antenna subset in the antenna set, a first location of the target antenna in the antenna set; determine, based on a correspondence relationship between the antenna set and the display region, a second location, the second location being the location in the display region corresponding to the first location; and, determine display content at the second location in the display region, and generate and execute a particular instruction with respect to the display content.

In particular, the first strategy is: an antenna set within a first sub-region in the region where the antenna set is located is used as the first antenna subset, wherein the first sub-region is smaller than the region where the antenna set is located; or, an antenna subset with a first density in the antenna set is used as the first antenna subset, the first density being smaller than the density of the antenna set.

In particular, the processor 63 is used to: based on the communication parameters of all antennas in the first antenna subset, select an antenna corresponding to the maximum communication parameter of the communication parameters as a target antenna; or, based on the communication parameters of all antennas in the first antenna subset, select, from the communication parameters, an antenna corresponding to a communication parameter which exceeds a first preset threshold as a target antenna.

As an implementation, as shown in FIG. 7, in practical applications, the electronic device further includes a switch array. The switch array includes the same number of switches as the antennas in the antenna set, and each switch is connected to one antenna. After the processor determines the first antenna subset from the antenna set according to the first strategy, the processor successively controls the switch corresponding to each antenna in the first antenna subset to be in a connecting state in order to successively allow the antennas to be in an operating state, so as to obtain feedback information of the communication with the second electronic device.

Those skilled in the art should understand that, the functions of each processing unit in the electronic device provided by an embodiment may be understood with reference to the relevant description of the above-mentioned information processing method.

Embodiment 8

As shown in FIG. 6, in an embodiment, the electronic device comprises: an antenna set 62, a display screen 61 and a processor 63, wherein: the display screen 61 is used for displaying content; the antenna set 62 includes at least two antennas and is disposed at one side of the display screen 61, wherein the antenna set 62 has no influence on sensing display content of the display screen 61, and a region where the antenna set 62 is located corresponds to at least part of a display region of the display screen 61; and the processor 63 is configured to determine a first antenna subset in the antenna set 62 according to a first strategy; successively allowing antennas in the first antenna subset to be in an operating state so as to obtain feedback information of communication with a second electronic device; and, during successively obtaining the feedback information of the antennas, determining the antenna as a target antenna when the communication parameter of any antenna in the feedback information reaches a second preset threshold.

In particular, the first strategy is: an antenna set within a first sub-region in the region where the antenna set is located is used as the first antenna subset, wherein the first sub-region is smaller than the region where the antenna set is located; or, an antenna subset with a first density in the antenna set is used as the first antenna subset, the first density being smaller than the density of the antenna set.

As an implementation, as shown in FIG. 7, in practical applications, the electronic device further includes a switch array. The switch array includes the same number of switches as the antennas in the antenna set, and each switch is connected to one antenna. After the processor determines the first antenna subset from the antenna set according to the first strategy, the processor successively controls the switch corresponding to each antenna in the first antenna subset to be in a connecting state in order to successively allow the antennas to be in an operating state, so as to obtain feedback information of the communication with the second electronic device.

Those skilled in the art should understand that, the functions of each processing unit in the electronic device provided by an may be understood with reference to the relevant description of the above-mentioned information processing method.

Those skilled in the art should understand that, embodiments may be provided as methods, systems or computer program products. Therefore, embodiments may be in the form of hardware embodiments, software embodiments, or embodiments combining software and hardware aspects. Meanwhile, embodiments may be in the form of computer program products implemented on one or more computer usable storage media (including but not limited to magnetic disk memories, optical memories, etc.) containing computer usable program codes. In the context of this document, a storage media is not a signal and "non-transitory" includes all media except signal media.

Embodiments are described with reference to the flowcharts and/or block diagrams of the methods, devices (systems) and computer program products according to embodiments. It should be understood that each flow and/or block in a flowchart and/or a block diagram and a combination of flows and/or blocks in a flowchart and/or block diagram may be implemented by computer program instructions. These computer program instructions may be provided to a processor of a general purpose computer, a special purpose computer, an embedded processing machine or other programmable data processing equipment to generate a machine, such that a device for implementing functions specified in one flow or more flows in a flowchart and/or one block or more blocks in a block diagram is generated through instructions executed by the processor of a computer or other programmable data processing equipment.

These computer program instructions may also be stored in a computer readable memory capable of guiding a computer or other programmable data processing equipment to operate in a particular mode, such that the instructions stored in the computer readable memory generate a product including an instruction device. The instruction device implements functions specified in one flow or more flows in a flowchart and/or one block or more blocks in a block diagram.

These computer program instructions may also be loaded onto a computer or other programmable data processing equipment, such that a series of operation steps are executed on the computer or other programmable data processing equipment to generate a processing implemented by the computer. As such, the instructions executed on the computer or other programmable equipment provide steps for implementing the functions specified in one flow or more flows in a flowchart and/or one block or more blocks in a block diagram.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

Additionally, embodiments may take the form of a product embodied in one or more computer readable storage mediums storing machine readable code, computer readable code, and/or program code, referred hereafter as code. The storage devices may be tangible, non-transitory, and/or non-transmission. The storage devices do not embody mere signals, though in certain embodiments, the storage devices employ signals for accessing code.

What is claimed is:

1. A method, comprising:
   displaying a plurality of contents via a display screen of a first electronic device;
   determining a subset of a plurality of antennas of the first electronic device based on positions of the antennas relative to the display screen, wherein said subset of antennas corresponds with respective contents as displayed via the display screen of the first electronic device;
   activating the subset of the antennas of the first electronic device to determine a target antenna from said subset of the antennas that is closest to a second electronic device arranged with respect to the display screen of the first electronic device; and
   transmitting a target content from said contents as displayed from the first electronic device to the second electronic device, wherein the target content corresponds with the target antenna.

2. The method according to claim 1, further comprising:
   determining a location of the target antenna of the first electronic device;
   determining a location of the display screen of the first electronic device based on a correspondence relationship between the positions of the target antennas and the target content as displayed via the display region of the first electronic device; and
   displaying the target content at said location of the display screen.

3. The method according to claim 1, wherein the plurality of antennas of the first electronic device is divided into blocks of antennas and the subset of antennas relates to one of the blocks of antennas.

4. The method according to claim 1, wherein the subset of antennas of the first electronic device defines a smaller density of antennas as compared with all of the plurality of antennas.

5. The method according to claim 1, wherein the activating the subset of antennas of the first electronic device comprises:
   the antennas in the subset of antennas successively obtaining feedback information from the second electronic device, wherein the feedback information comprises communication parameters; and
   determining the target antenna based on the communication parameters.

6. The method according to claim 5, wherein the determining the target antenna based on the communication parameters comprises:
   selecting from the subset of antennas, the antenna with the maximum communication parameter of the communication parameters as the target antenna; or
   selecting from the subset of antennas, the antenna with a communication parameter of the communication parameters that exceeds a first preset threshold as the target antenna.

7. The method according to claim 1, wherein the determining the target antenna comprises:
   the antennas in the subset of antennas successively obtaining feedback information from the second electronic device; and
   determining the antenna with a communication parameter that reaches a second preset threshold as the target antenna.

8. The method according to claim 1, further comprising:
   generating and executing an instruction relating to the target content.

9. An electronic device, comprising:
   a display screen for displaying a plurality of contents;
   a plurality of antennas arranged relative to the display screen;
   a processor; and
   a storage media that stores instructions executable by the processor to:
      determine a subset of the plurality of antennas based on positions of the antennas relative to the display screen, said subset of antennas corresponding with respective contents as displayed via the display screen;
      activate the subset of antennas to determine a target antenna from said subset of antennas that is closest to another electronic device arranged with respect to the display screen; and transmit a target content from said contents as displayed to the other electronic device, the target content corresponding with the target antenna.

10. The electronic device according to claim 9, wherein the storage media further stores instructions executable by the processor to:
   determine a location of the target antenna;
   determine a location of the display screen based on a correspondence relationship between the positions of the target antennas and the target content as displayed; and
   display the target content at said location of the display screen.

11. The electronic device according to claim 9, wherein the storage media further stores instructions executable by the processor to successively obtain feedback information of the communication between the antennas in the subset of antennas and the other electronic device, wherein the feedback information comprises communication parameters, and to determine the target antenna based on the communication parameters.

12. The electronic device according to claim 9, wherein the storage media further stores instructions executable by the processor to successively obtain feedback information of the antennas, and to determine the antenna with a communication parameter that reaches a second preset threshold as the target antenna.

13. The electronic device according to claim 9, wherein the storage media further stores instructions executable by the processor to generate and execute an instruction relating to the display content.

14. The electronic device according to claim 9, wherein the storage media further stores instructions executable by the processor to divide the plurality of antennas into blocks of antennas and the subset of antennas relates to one of the blocks of antennas.

15. The electronic device according to claim 9, wherein the subset of antennas defines a smaller density of antennas as compared with all of the plurality of antennas.

16. The electronic device according to claim 9, wherein the antennas are near-field communication antennas.

* * * * *